United States Patent Office 2,750,624
Patented June 19, 1956

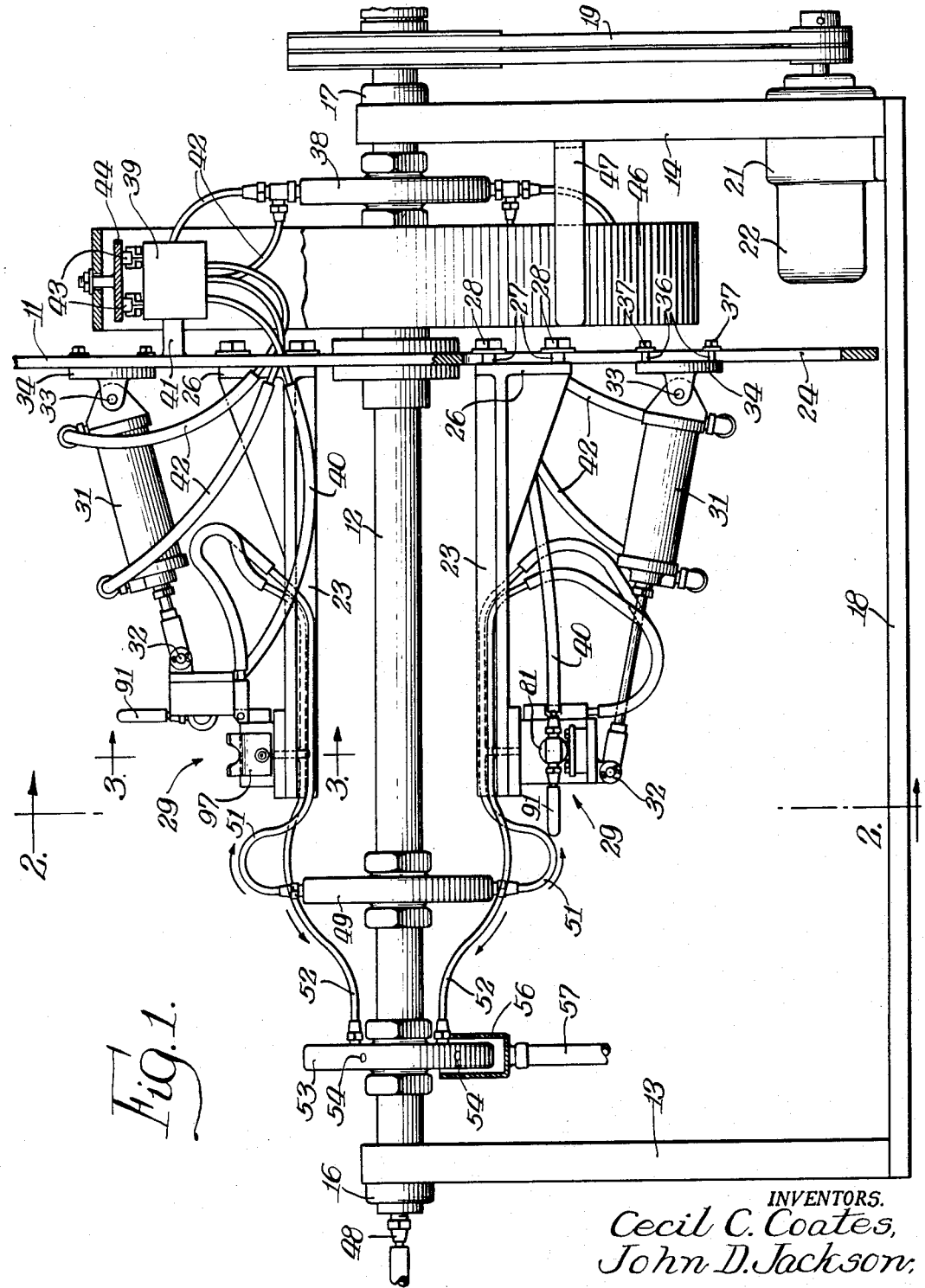

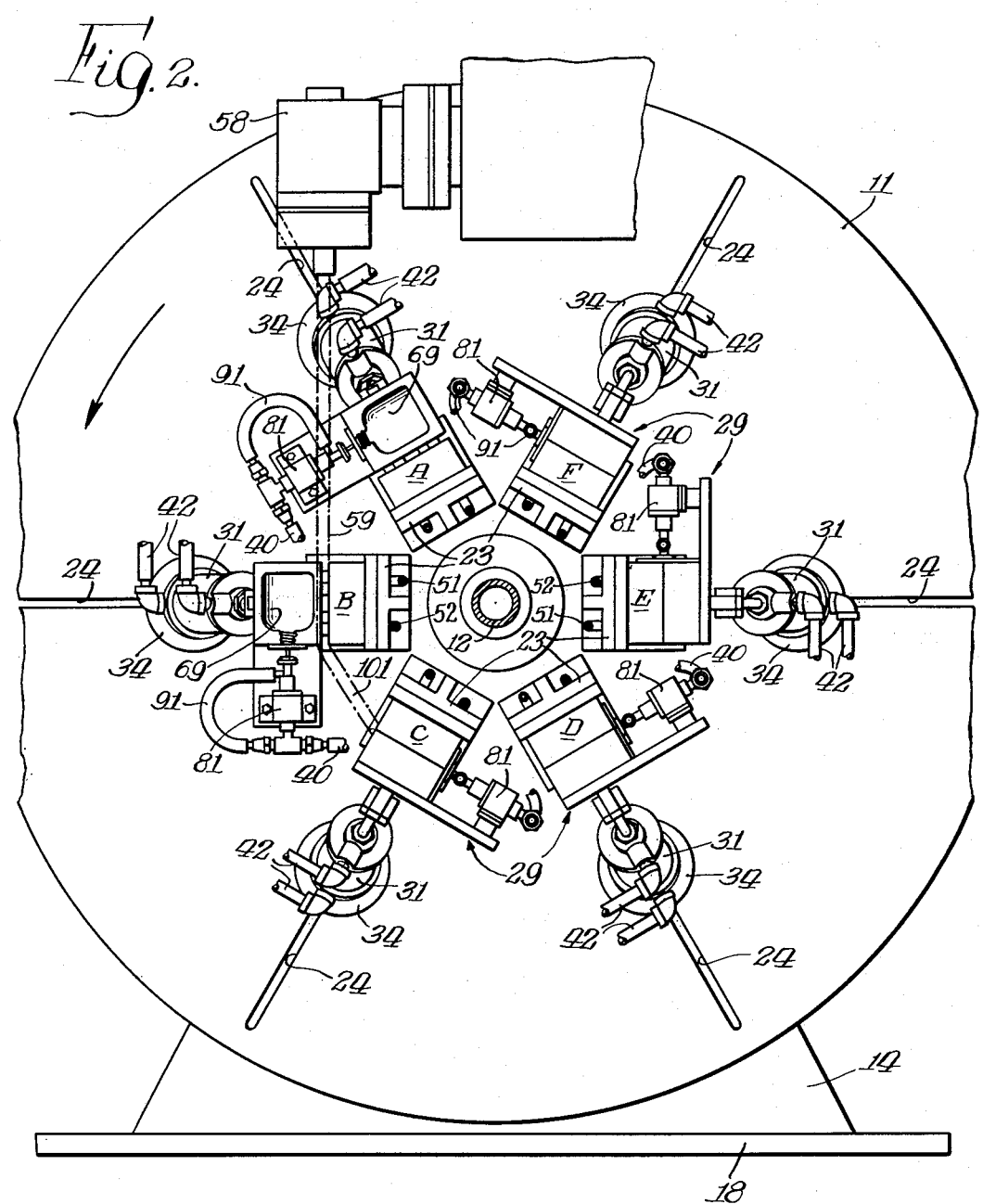

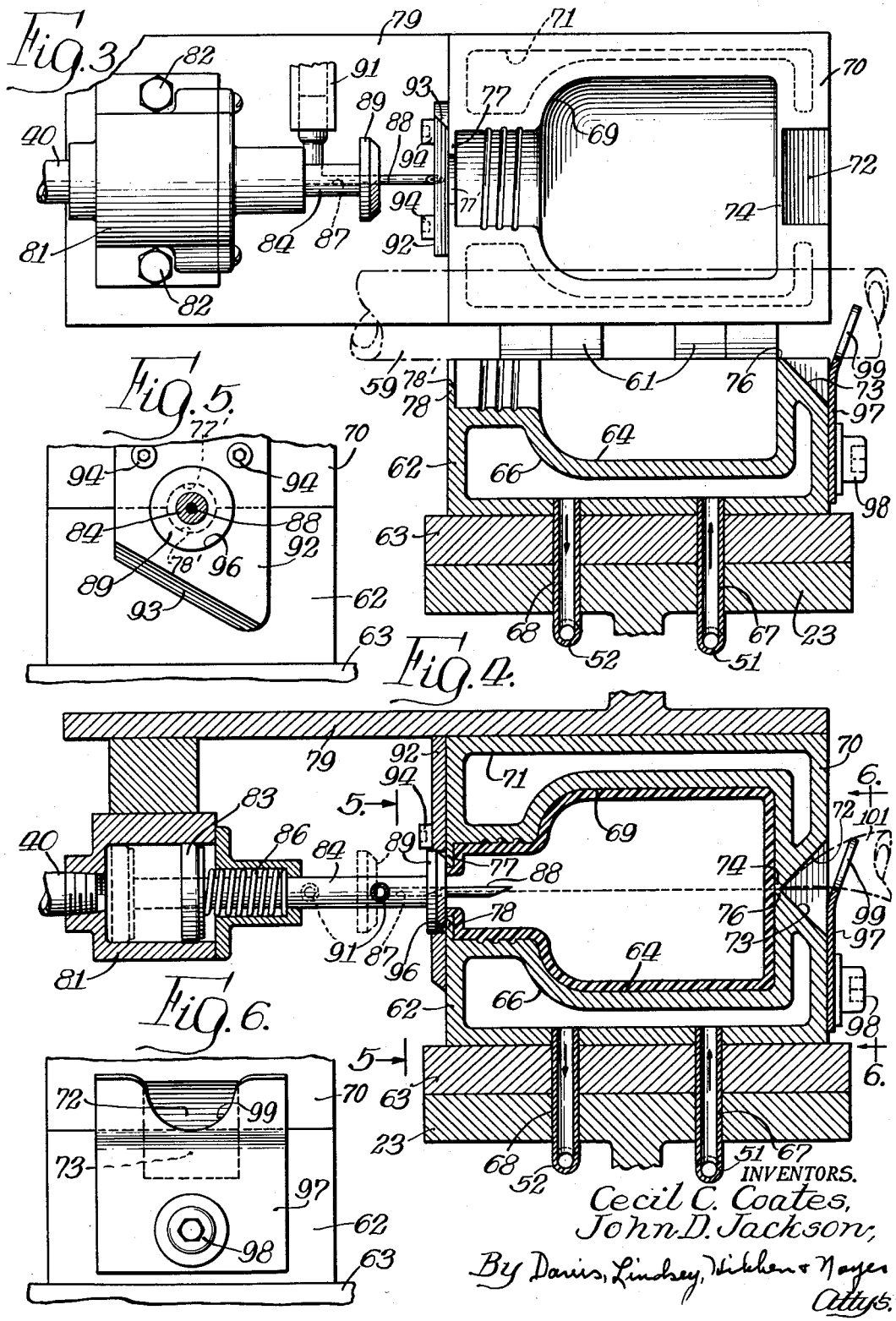

2,750,624
MACHINE AND METHOD FOR MAKING HOLLOW ARTICLES

Cecil C. Coates, Prescott, Ariz., and John D. Jackson, Western Springs, Ill., assignors to Royal Manufacturing Company, Inc., Prescott, Ariz., a corporation of Arizona Application September 22, 1951, Serial No. 247,828

35 Claims. (Cl. 18—5)

This invention relates generally to improvements in the fabrication of hollow plastic articles and more particularly to a novel continuous blow-molding machine for making bottles or the like from tubular thermoplastic material. The invention also involves a novel method for making articles of the foregoing character.

For the most part the manufacture of plastic containers and the like from a thermoplastic material such as polyethylene has involved the use of expensive and relatively complex equipment including retractable extrusion and blowing nozzles adapted to be inserted into and withdrawn from a succession of molds in an intermittent manner. The rate of production with such equipment has been found to be relatively slow with the result that a large number of such machines are required in order to realize a high output thereby further increasing investment and manufacturing costs.

In order to overcome the disadvantages of machines of the above type, it has been proposed to provide a plurality of molds and blowing devices on a rotating horizontal table adapted to cooperate with a stationary horizontal extruder which extrudes a continuous length of tubular thermoplastic material into the molds for obtaining continuous production of hollow articles. However, there are certain serious limitations in a continuous machine of the latter type which derive primarily from the fact that the molds are disposed at all times in a horizontal plane. The most serious disadvantage is the marked tendency for the soft plastic tubing to sag under its own weight when extruded into horizontal position in a mold cavity and before the blowing operation begins. As a result of sagging, the tubular plastic assumes a non-symmetrical shape with weakened areas of diminished wall thickness and consequent danger of rupturing or "blowing through" the wall of the tubing during the subsequent blowing step. This difficulty is particularly troublesome in the fabrication of hollow articles of relatively large size.

In addition, the horizontal arrangement of molds as heretofore proposed introduces a difficult alignment problem in insuring accurate registry of the extruded tubing in the molds prior to blowing. Moreover, in the horizontal arrangement the width of the molds radially of the rotating horizontal table imposes a serious limitation on the proximity with which the molds can be arranged circumferentially on the table. As will hereinafter appear, it is highly desirable to position the molds as closely together as possible in order to minimize wastage of plastic tubing in between the individual molds.

Accordingly, a primary object of our invention is to provide a novel continuous machine of the class described which eliminates the disadvantages inherent in continuous machines of the type heretofore known.

A further object of the invention is to provide a novel continuous blow molding machine for the manufacture of hollow articles from tubular thermoplastic material in which the blowing operation can be initiated without the thermoplastic material sagging or otherwise assuming a non-symmetrical conformation in the mold cavity.

Another object of the invention is to provide a novel machine of the foregoing character in which the tubular thermoplastic material in the molds can be blown substantially at any desired angular position of the tubular material between vertical and horizontal positions.

An additional object of the invention is to provide a novel machine of the foregoing character in which the problem of insuring alignment or registry of the tubular thermoplastic material in the molds is greatly simplified as compared with the machines heretofore known.

Still another object of the invention is to provide a novel machine of the above described character in which wastage of tubular thermoplastic material is greatly minimized by arrangement of the molds in more compact end-to-end relation as compared with the machines heretofore suggested.

A still further object of the invention is to provide a machine of the character described having novel and improved means for blowing the tubular thermoplastic material in the molds and for severing the tubing into sections between the individual molds.

A related object of the invention is to provide a novel and improved method for the manufacture of hollow plastic articles.

Other objects and advantages of the invention will become apparent from the subsequent detailed description taken in conjunction with the accompanying drawings wherein:

Fig. 1 is a side elevational view with portions thereof in section showing a machine embodying the features of our invention;

Fig. 2 is a transverse view as seen along the line 2—2 of Fig. 1 with the machine in a slightly different position and showing in addition the extruder portion of the machine;

Fig. 3 is a view taken along the line 3—3 of Fig. 1 and showing a mold unit of the machine in open position;

Fig. 4 is a view similar to Fig. 3 but showing the mold unit in closed position;

Fig. 5 is a fragmentary end view of the closed mold unit as taken along the line 5—5 of Fig. 4; and Fig. 6 is a fragmentary opposite end view of the closed mold unit as taken along the line 6—6 of Fig. 4.

Broadly speaking, the machine comprising our invention differs from the continuous machines heretofore known in that we provide a plurality of mold units each comprising a pair of cooperating mold halves and arranged circumferentially on a rotatable support which is mounted for rotation on a horizontal axis and in a generally vertical plane. Thus, each mold unit of our device traverses a circular path in a vertical plane and, as will be seen hereinafter, the angular position of each mold cavity undergoes a continuous change in a vertical plane during each revolution of the machine. The invention also provides suitable stationary means for extruding in a vertical downward direction a continuous tube of thermoplastic material which is received successively in each of the molds as the molds move progressively into vertical receiving position during rotation of the device. Each mold unit is also provided with individual cooling means and individual fluid injection means for introducing air or other suitable fluid into the mold cavity and thereby expanding the section of plastic tubing within the cavity into contact with the walls of the cavity and cooling the same during rotation of the machine. Each mold unit also includes a special cutting blade for severing the tubing between individual molds upon closure of the mold halves, and the air injector for each mold unit is extensible and retractible through the cutting blade for effecting expansion or blowing of the plastic tubing during a predetermined portion of each revolution of the machine.

Referring to Figs. 1 and 2 of the drawings, the general organization of the machine will first be described. In its preferred embodiment as illustrated herein, the machine comprises a flat vertical circular disk or table 11 which is rotatably supported at its center on an elongated drive shaft 12. The drive shaft is journaled adjacent its opposite ends on a horizontal axis by means of a pair of upright standards 13 and 14 having suitable bearings 16 and 17, respectively, and mounted on a base or support 18. Rotation of the shaft 12 and the disk 11 is effected by means of a belt drive 19 connected to a variable speed reducer 21 and a motor 22 mounted on the base 18.

Extending horizontally from one side of the disk 11 and generally perpendicular thereto are a plurality of elongated mold supports or brackets 23 adjustably secured at their inner ends to the disk 11 and adapted to be retained in any desired position radially of the disk 11. For permitting radial adjustment of the brackets 23, the disk 11 is provided with a plurality of radially extending slots 24 and the brackets 23 are formed with integral base portions 26 each having a pair of threaded studs 27 extending through the slots 24. Suitable nuts or retainers 28 are threaded onto the projecting ends of the studs 27 for clamping the brackets rigidly on the disk 11 at any desired position radially thereof.

A mold unit, indicated generally at 29 and described hereinafter in detail, is rigidly affixed adjacent the outer end of each of the brackets 23. Each of the mold units 29 comprises a pair of hinged mold halves one of which is rigidly secured to the bracket or support 23 and the other of which is pivotally attached for opening and closing of the mold. Although six mold units are shown in the drawing by way of example, it will be understood that the number of molds may vary as desired. Suitable means is provided for each mold unit 29 for opening and closing the pivoted mold half at predetermined intervals of time during the operation of the machine. In the embodiment of the invention herein illustrated, the actuating means for the pivoted or movable mold half comprises an angularly extending reciprocal air cylinder 31 which is pivotally connected, as at 32, at one end thereof to the movable mold half and which is likewise pivotally connected, as at 33, at its opposite end to an adjustable support 34. The supports 34 are provided with threaded studs 36 and coacting nuts 37 for securing the supports 34 in any desired radial position on the disk 11 in the same manner as the brackets 23. It will be seen that there is thus provided an individual mold-actuating air cylinder 31 for each mold unit 29 with each bracket 23 and its corresponding air cylinder 31 being radially adjustable on the disk 11 in a common radial slot 24.

For operating the air cylinders 31, a supply of compressed air is introduced axially by means not shown through the right hand end of the shaft 12 (as viewed in Fig. 1) into a disk-like plenum chamber 38 rigidly carried on the shaft 12 for rotation therewith. A plurality of multiple valve mechanisms 39 are rigidly supported on the disk 11, as by supports 41, for controlling the introduction and discharge of air to and from each of the cylinders 31. Although for the sake of simplicity only one such valve means is shown in Fig. 1, it will be understood that each mold unit and actuating cylinder has its own valve mechanism. The plenum chamber 38 is connected to the cylinders 31 through the several valve means 39 by a plurality of tubular conduits 42. The valve structures 39 also control the air supply for the air injection devices associated with each of the mold units 29, as hereinafter described, and a conduit 40 extends between each valve mechanism 39 and its associated mold unit 29 for this purpose. For actuating each of the valve mechanisms 39, a plurality of movable cam rollers 43 are provided which coact with a plurality of circumferentially adjustable camming shoes 44 which are in turn adjustably supported adjacent the inner periphery of an annular band or cam track 46. The cam track 46 is fixedly supported adjacent the rotatable disk 11 by means of a bracket 47 rigidly attached to the cam track 46 and to the upright standard 14. Inasmuch as the cam track 46 and the cam shoes 44 are stationary whereas the valve mechanisms 39 carrying the cam rollers 43 are rotatable with the disk 11, it will be seen that the valve mechanisms 39 can be actuated in a predetermined desired sequence for operating the air cylinders 31 as the disk 11 undergoes rotation relative to the fixed cam track 46.

As described below, the mold halves comprising the mold units 29 are each provided with suitable hollow chambers through which a cooling medium such as water is circulated during operation of the machine. For this purpose, a supply of cooling water is introduced through a rotatable coupling 48 at the left hand side of the shaft 12 (as viewed in Fig. 1) into a cooling water supply or plenum chamber 49 carried on the shaft 12. A plurality of tubular conduits 51 extend from the outer periphery of the plenum chamber 49 and communicate with the respective halves of each mold unit 29 for supplying water thereto. Effluent cooling water from the mold units 29 is returned by a plurality of similar connecting conduits 52 to another plenum chamber 53 which is likewise mounted on the shaft 12 for rotation therewith. It will be understood that the plenum chamber 53 functions as a discharge reservoir and is therefore not in communication with the interior of the shaft 12. The outer periphery of the plenum chamber 53 is formed with a plurality of discharge apertures 54 through which the effluent cooling medium can flow into a connecting trough 56 having a drain line 57.

In Fig. 2 a plastic extruder is shown at 58 and is rigidly mounted adjacent the rotating disk 11 for extruding a continuous length of softened thermoplastic tubing 59 downwardly into the mold units 29 as the latter rotate into successive receiving position during operation of the machine. As will be described later in connection with the operation of the machine, the rotary positions of the mold units 29 are so coordinated with the position of the extruder 58 that the plastic tubing 59 is received in each mold while the latter is in substantially vertical position.

Referring now to Figs. 3 to 6, the detailed construction of one of the mold units 29 will be described. In Fig. 3 the mold unit is shown in open position and it will be seen that the unit comprises a pair of mold sections or halves which are hinged together as at 61. For convenience, the respective halves of the mold units 29 will be referred to herein as the "inner" and "outer" halves, it being understood that the terms "inner" and "outer" are used with reference to the horizontal axis of rotation of the disk 11. The inner mold half, indicated at 62, is rigidly secured on a base plate 63 adjacent the outer end of the supporting bracket 23 and is provided with a depression or cavity 64 suitable for forming a bottle having a threaded neck portion. The mold half 62 is also provided with a hollow interior defining a cooling chamber 66 to which cooling water is supplied through a tubular inlet 67 branching off from the supply conduit 51 and extending through the bracket 23 and the base plate 63 into the chamber 66. Effluent cooling water is discharged from the chamber 66 through a similar tubular branch 68 connected to the return conduit 52. The outer or pivotally movable mold half, indicated at 70, is of similar construction having a mating depression or cavity 69 and a hollow cooling chamber 71 having flexible connections (not shown) with the conduits 51 and 52.

The lateral ends of both mold halves adjacent the base of the bottle cavity are beveled, as at 72 and 73, to define a pair of pinching jaws or edges 74 and 76 for clamping and sealing the plastic tubing 59 therebetween as described hereinafter. The opposite lateral ends of the mold halves are formed with inwardly extending radial flanges 77 and 78 having complementary semi-circular openings 77' and 78', respectively.

Rigidly attached to the outer mold half 70 is an elongated supporting plate 79 which extends beyond the neck end of the mold cavity and carries an air injection cylinder 81 rigidly mounted on the plate 79 as by screws 82. As seen in Fig. 4, the air injection cylinder 81 contains a reciprocable piston 83 having a piston rod 84 and a return spring 86. Air or other actuating fluid is supplied to the cylinder 81 through the tubular conduit 40 as hereinbefore mentioned. The outer end of the piston rod 84 has an internal bore 87 communicating with a hollow air injection needle 88 and is also provided with a seal in the form of an annular resilient washer 89 of rubber or the like. Air is supplied to the bore 87 and the needle 88 through a branch conduit 91 extending from the air supply conduit 40 (see Figs 1 and 2).

When the mold unit is in open position as illustrated in Fig. 3, the common air supply from the conduit 40 to the cylinder 81 and the needle 88 is cut off by means of the valve structure 39 and the spring 86 holds the piston 83 in retracted position in the cylinder 81 as indicated by broken lines in Fig. 4. However, when the mold unit is closed (Fig. 4), air is supplied under pressure through the conduit 40 for actuating the piston 83 whereby to introduce the hollow needle 88 into the open or neck end of the mold cavity and air is likewise simultaneously introduced through the bore 87 and the needle 88 into the mold cavity.

A knife blade 92 having a sharp cutting edge 93 is rigidly secured, as by screws 94, to the lateral neck end of the outer mold half 70 and is adapted to coact with the corresponding lateral end of the mold half 62 for cutting or severing the plastic tubing 59 during pivotal movement of the mold half 70 into closed position adjacent the mold half 62. The blade 92 is formed with an aperture 96 adapted to be positioned coaxially with the longitudinal axis of the mold cavity and the plastic tubing therein and also with the axis of the needle 88 when the mold is in closed position. From Fig. 4, it will be seen that when the mold is closed the jaws 74 and 76 will effect collapsing and sealing of the tubular plastic material 59 at the base end of the mold cavity and at the same time the radial flanges 77 and 78 exert a norrowing or constrictive effect on the tubing 59 adjacent the neck end of the mold cavity and the severed open end of the plastic tubing therein. When the piston 83 is actuated to extend the needle 88 into the neck end of the mold cavity and the severed open end of the plastic tubing, the sealing washer 89 is received within the aperture 96 of the cutting blade 92 and seats tightly against the flanges 77 and 78, and also against the severed end portion of the plastic tubing 59, with the needle 88 extending through the opening 77'-78' provided between the flanges 77 and 78 and into the axially aligned open end of the plastic tube 59, as seen in full lines in Fig. 4. When air or other expanding fluid is then injected under pressure through the needle 88, it will be seen that the softened plastic tubing will then be expanded into close contact with the walls of the mold cavity inasmuch as the mold cavity and the tubing are sealed at each end thereof.

The inner mold half 62 has a guide member 97 adjustably secured by a screw 98 to the lateral end thereof adjacent the jaw 76. The guide member 97 is provided with a U-shaped grooved portion 99 (Fig. 6) at its outer end which flares outwardly from the adjacent lateral end of the mold. As will hereinafter appear, the purpose of the guide member 97 is to insure accurate registry of the extruded plastic tubing 59 in the longitudinal center of the mold cavity, and to facilitate this function the guide member 97 may be affixed in desired adjusted position relative to the center of the mold cavity by manipulation of the screw 98.

To facilitate a further understanding of our invention, the mode of operation of the machine and the operating cycle of a single mold will now be described. Referring particularly to Fig. 2, the various mold units have been identified according to their circumferential position by the letters A to F inclusive. Assuming that the disk 11 is rotating in a counterclockwise direction as viewed in Fig. 2, it will be seen that each mold unit is open and its air injection needle is retracted from the mold cavity when the mold is in the position indicated at A. As the disk 11 rotates, the leading or neck end of the inner mold half engages the plastic tubing 59 first and as rotation continues the cavity of the mold half is brought into substantial vertical alignment with the depending tubing 59, the latter being received and aligned within the cavity of the inner mold half at the B position of the mold. During rotation of the disk 11, the guide member 97 at the trailing end of the mold unit engages the plastic tubing 59 and accurately aligns the same in the center of the mold cavity at the base end thereof. It will be understood that, inasmuch as the depending tubing 59 is received within the open mold when the latter is in approximately vertical position, the weight of the tubing 59 per se supplements and assists in the alignment of the tubing in the center of the mold cavity so that to a large extent the necessary alignment is accomplished automatically with the guide member 97 facilitating the necessary registry at the base or trailing end of the mold cavity.

As soon as the tubing 59 is in longitudinal aligned position in the mold cavity, the outer mold half begins to close by actuation of its air cylinder 31 as determined by the corresponding cam-operated valve means 39. When the mold unit reaches the position C, it will be seen that the knife blade 92 on the outer mold half has completely severed the plastic tubing at the leading end of the mold and the air injection needle 88 has entered the mold cavity for the blowing operation. At the same time, the plastic tubing 59 although collapsed and sealed by the clamping jaws at the trailing end of the mold unit is still connected, as at 101 (Figs. 2 and 4), to the continuous length of tubing 59 to assist in drawing the tubing into position in the preceding open mold unit, as for example the unit in position B.

During further rotation of the disk 11 the closed mold unit moves progressively through the positions indicated at C, D, E, and F and during this time the section of plastic tubing in the mold is expanded into contact with the interior of the mold cavity and is held in expanded condition while the cooling medium in the cooling chambers 67 and 61 of the respective mold halves causes the expanded plastic material to harden.

Intermediate the mold positions F and A and upon conclusion of the cooling step, the cam actuated valve mechanism 39 causes the air injection needle to be retracted from the mold and also causes the mold to open to permit manual removal of the completed hollow article thereby placing the mold in condition to repeat the operation thus described.

Although the diameter and wall thickness of the extruded plastic tubing 59 is determined primarily by the size of the nozzle on the extruder 58, our device affords an additional means of controlling and varying the tube diameter and wall thickness. Inasmuch as each of the mold units closes and clamps about the tubing 59 without severing the tubing at the trailing end of the rotating mold, it will be seen that the moving mold unit actually pulls the tubing downwardly from the extruder 58, as illustrated by the mold unit B in Fig. 2. By coordinating the speed of rotation of the disk 11 through the variable speed reducer 21 with the output speed of the extruder 58, it will be understood that the mold units 29 can be operated at a predetermined excess speed whereby to exert a tension or pulling force on the extruded tube 59 thereby causing an elongation of the tubing with consequent diminution of the diameter and wall thickness of the tubing. As a result, the wall thickness of the blown bottle or other article may also be controlled thus providing an increased flexibility of operation of the apparatus with a given extruder nozzle.

From the foregoing description of our invention, it will be readily understood that the vertical rotational arrangement and mounting of the mold cavities provide substantial advantages in a machine of this character. In the first place, the longitudinal axes of the mold cavity and the plastic tubing are always perpendicular to the axis of rotation of the disk and parallel to the plane thereof whereby these axes of the mold cavity and the tubing therein undergo a progressive angular change between horizontal and vertical positions in a given vertical plane during each revolution of the machine. In the horizontally supported mold arrangement heretofore suggested, the axis of the mold always remained in a horizontal plane and consequently the softened plastic tubing was necessarily extruded into the mold in a horizontal plane so that there was a definite tendency for the extruded tubing to sag under its own weight within the mold cavity before blowing could begin. This tendency resulted in unevenness in the plastic tubing and areas of diminished wall thickness which were easily ruptured during blowing. By means of our arrangement, however, the extruded plastic tubing is received within each successive mold unit while the longitudinal axis of the mold cavity is substantially in a vertical position so that introduction of expanding fluid can be initiated while the mold is still in substantially vertical position thereby avoiding the detrimental effects of sagging of the tubing.

Our arrangement also permits a relatively wide choice in the angular position of the mold during blowing or expansion. In other words, it will be seen by referring to Fig. 2 that between the positions B and F the blowing operation can be so controlled, if desired, to effect expansion of the softened section of plastic tubing while the mold is in any predetermined angular position between vertical and horizontal. This flexibility of operation is of particular importance when it is desired to fabricate uneven or non-symmetrical articles.

Another highly important advantage of our device, as hereinbefore described, resides in the great ease with which alignment and registry of the softened plastic tubing within the mold cavities is effected. Because the plastic tubing is extruded vertically downwardly and is received within the molds as each of the molds approaches substantially vertical position, the weight of the tubing and the force of gravity are effectively utilized to obtain the desired accurate registry. To assist in obtaining the desired alignment, we find it desirable to provide merely a relatively simple guide member at the trailing end of each mold unit thereby eliminating the intricate methods heretofore required to guide the extruded tubing into the center of the mold cavity.

It will also be seen that by the mold arrangement on the vertical rotating disk as herein described, we are able to position a plurality of molds of varying width, i. e. radially of the supporting disk, in a relatively close and compact arrangement circumferentially of the supporting disk thereby minimizing the wastage of plastic tubing between the individual mold units. It will also be seen that by reason of the radial adjustability of each mold unit on the rotating disk, we can readily substitute molds of different longitudinal dimensions for fabricating articles of varying size while still utilizing the same general apparatus.

Although the invention has been described in connection with certain specific structural features, it will be understood that various equivalent structures and modifications may be resorted to without departing from the scope of the invention as defined in the appended claims.

We claim:

1. An apparatus for making hollow plastic articles from a continuous length of softened tubular plastic material comprising in combination an upright rotatable disk mounted for rotation on a horizontal axis, a plurality of mold supports extending outwardly in a horizontal direction at one side of said disk in circumferentially spaced arrangement said disk being provided with a plurality of aperture means arranged radially of the disk, adjustable fastening means cooperating with said supports and with said aperture means for securing the supports in desired adjusted position radially of said disk, a plurality of sectional molds each mounted adjacent the outer end of one of said mold supports whereby said molds traverse a continuous path in a vertical plane upon rotation of said disk, means mounted on said one side of said disk and operably connected to each of said molds for opening and closing the same in predetermined sequence, said molds being adapted to receive the tubular plastic material when the molds are in open position, and fluid injection means operably associated with each of said molds for injecting an expanding fluid intermittently into each of said molds when the latter are in closed position with the tubular material clamped therein.

2. An apparatus for making hollow plastic articles from softened tubular plastic material comprising in combination an upright rotatable disk mounted for rotation on a horizontal axis, a plurality of mold supports extending outwardly in a horizontal direction at one side of said disk in circumferentially spaced arrangement and rigidly affixable at their inner ends to said disk, a plurality of sectional molds each mounted adjacent the outer end of one of said mold supports whereby said molds traverse a continuous path in a vertical plane upon rotation of said disk, said molds each comprising an inner mold half rigidly secured to the corresponding mold support and an outer mold half hingedly affixed to the inner mold half for pivotal movement toward and away from said disk, a plurality of mold actuators carried by said disk and operably connected with the outer half of each of said molds for opening and closing the same in predetermined sequence, said molds being adapted to receive the tubular plastic material when the molds are in open position, and fluid injection means operably associated with each of said molds for injecting an expanding fluid intermittently into each of said molds when the latter are in closed position with the tubular material clamped therein.

3. An apparatus for making hollow plastic articles from a continuous length of softened tubular plastic material comprising in combination a plurality of sectional molds, a rotatable support comprising a disk having said molds arranged in circumferentially spaced relation thereon for traversing a continuous path, means operably associated with each of said molds for opening and closing the same in predetermined sequence, said molds being adapted to receive the tubular plastic material when the molds are in open position, fluid injection means operably associated with each of said molds for injecting an expanding fluid intermittently into each of said molds when the latter are in closed position with the tubular material clamped therein, said disk being provided with a plurality of aperture means arranged radially of the disk, and adjustable fastening means cooperating with said molds and with said aperture means for securing said molds on said disk in desired radial position thereon whereby to permit use of molds of varying size requiring varying space circumferentially of the disk.

4. An apparatus for making hollow plastic articles from a continuous length of softened tubular plastic material comprising in combination an upright rotatable disk mounted for rotation on a horizontal axis, a plurality of elongated supporting brackets extending outwardly in a horizontal direction at one side of said disk in circumferentially spaced arrangement thereon, means at the inner ends of said brackets for securing the same in desired adjusted position radially of said disk, a plurality of sectional molds carried adjacent the outer ends of said brackets, each of said molds having an inner half rigidly secured to the corresponding bracket and an outer half hingedly secured to the inner half for pivotal movement toward and away from said disk, a plurality of actuators for opening and closing the molds in predetermined sequence, said actuators being supported at said one side of said disk and adjustable radially thereof and being operably connected to the outer half of each of said molds, said molds being adapted to receive the tubular plastic material when in open position, and fluid injection means for introducing an expanding fluid into each of said molds when the latter are in closed position with the tubular material clamped therein, the radial adjustability of said brackets and said actuators on said disk permitting the use of molds of varying size and requiring varying circumferential spacing of said brackets.

5. The apparatus of claim 4 further characterized in that said disk is provided with a plurality of radially extending slots with said brackets and said actuators being radially slidable in said slots and being securable in desired radial position therein.

6. An apparatus for making hollow plastic articles from softened tubular plastic material comprising in combination a plurality of sectional molds each comprising a pair of mold halves defining a mold cavity having a longitudinal axis and adapted to receive the tubular plastic material when the mold is open, a rotatable support carrying said molds for successive alignment thereof with the tubular plastic material, means carried by said support for opening and closing said mold halves in predetermined sequence, means on each of said molds adjacent one end of the mold cavity for collapsing and sealing the tubular plastic material when the mold is in closed position, a plurality of retractable fluid injectors each mounted adjacent the opposite end of one of the mold cavities and adapted to be positioned coaxially with the longitudinal axes of the cavity and the tubular plastic material contained therein when the mold is closed, said injectors being axially shiftable at predetermined intervals for extension axially into the tubular plastic material when the mold is closed, and sealing means carried by said injectors for sealing the opposite ends of the mold cavities whereby to permit an expanding fluid to be introduced into the tubular plastic material for expanding the latter into contact with the walls of the cavity when said injectors are in extended position within the molds.

7. An apparatus for making hollow plastic articles from softened tubular plastic material comprising in combination a plurality of sectional molds each comprising a pair of mold halves defining a mold cavity having a longitudinal axis and adapted to receive the tubular plastic material when the mold is open, a rotatable support carrying said molds for successive alignment thereof with the tubular plastic material, means carried by said support for opening and closing said mold halves in predetermined sequence, means on each of said molds adjacent one end of the mold cavity for collapsing and sealing the tubular plastic material when the mold is in closed position, cutting means on each of said molds adjacent the opposite end of the mold cavity for severing the tubular plastic material upon closure of the mold, and retractable means associated with each of said molds adjacent said opposite end of the mold cavity for introducing an expanding fluid axially into the severed open end of the tubular plastic material when the mold is closed.

8. An apparatus for making hollow plastic articles from softened tubular plastic material comprising in combination a plurality of sectional molds each comprising a pair of mold halves defining a mold cavity having a longitudinal axis and adapted to receive the tubular plastic material when the mold is open, a rotatable support carrying said molds for successive alignment thereof with the tubular plastic material, means carried by said support for opening and closing said mold halves in predetermined sequence, means on each of said molds adjacent one end of the mold cavity for collapsing and sealing the tubular plastic material when the mold is in closed position, a cutting blade mounted on one half of each of said molds adjacent the opposite end of the mold cavity for severing the tubular plastic material upon closure of the mold, said blade having an aperture therethrough adapted to be positioned coaxially with the longitudinal axes of the mold cavity and the tubular plastic material contained therein when the mold is closed, and a retractable fluid injection needle at said opposite end of each of said molds and adapted to extend through said aperture for introducing an expanding fluid axially into the severed open end of the tubular plastic material when the mold is closed.

9. An apparatus for making hollow plastic articles from softened tubular plastic material comprising in combination a plurality of sectional molds each comprising a pair of mold halves defining a mold cavity having a longitudinal axis and adapted to receive the tubular plastic material when the mold is open, a rotatable support carrying said molds for successive alignment thereof with the tubular plastic material, means carried by said support for opening and closing said mold halves in predetermined sequence, means on each of said molds adjacent one end of the mold cavity for collapsing and sealing the tubular plastic material when the mold is in closed position, a cutting blade mounted on one half of each of said molds adjacent the opposite end of the mold cavity for severing the tubular plastic material upon closure of the mold, said blade having an aperture therethrough adapted to be positioned coaxially with the longitudinal axes of the mold cavity and the tubular plastic material contained therein when the mold is closed, a retractable fluid injection needle operably mounted on said one half of each of said molds and shiftable axially at predetermined intervals for extension through the aperture of the cutting blade into the severed open end of the tubular plastic material, and sealing means carried by said needle and adapted to extend into said aperture into sealing relation with the adjacent end of the mold and the severed open end of the tubular plastic material whereby to permit introduction of an expanding fluid into said severed open end and consequent expansion of the tubular plastic material into contact with the walls of the mold cavity.

10. In an apparatus for making hollow plastic articles, a sectional mold comprising a pair of complementary mold halves defining a mold cavity having a longitudinal axis and adapted to receive an elongated tubular length of softened plastic material, means for opening and closing said mold halves, means on said mold halves adjacent one end of the mold cavity for collapsing and sealing the tubular plastic material when the mold is closed, a movable fluid injector operably associated with said mold adjacent the opposite end of the mold cavity for introducing an expanding fluid axially into the opposite end of the length of tubular plastic material contained in the mold when the latter is closed reciprocating means for effecting back and forth axial shifting movement of said fluid injector at predetermined intervals, said injector being shiftable in one direction of movement thereof into extended position for introducing expanding fluid axially into the tubular plastic material and being shiftable in the opposite direction of movement thereof into retracted position in spaced relation from said opposite end of the length of tubular plastic material, and means for selectively supplying expanding fluid to said injector when the latter is in said extended position and for interrupting the supply of expanding fluid when the injector is in said retracted position.

11. In an apparatus for making hollow plastic articles, a sectional mold comprising a pair of complementary mold halves adapted to be opened and closed and defining a mold cavity having a longitudinal axis and adapted to receive an elongated tubular length of softened plastic material, means on said mold halves adjacent one end of the mold cavity for collapsing and sealing the tubular plastic material when the mold is closed, a movable fluid injector mounted adjacent the opposite end of the mold cavity and adapted to be positioned coaxially with the longitudinal axes of the cavity and the tubular plastic material contained therein when the mold is closed, reciprocating means for effecting axial shifting of said injector at predetermined intervals between an extended position in which the injector extends axially into the tubular plastic material in the mold when the latter is closed and a retracted position in which the injector is withdrawn from the tubular plastic material when the mold is open, and sealing means carried by said injector for sealing the opposite end of the mold cavity whereby to permit an expanding fluid to be introduced into the tubular plastic material for expanding the latter into contact with the walls of the cavity when said injector is in extended position within the mold.

12. In an apparatus for making hollow plastic articles, a sectional mold comprising a pair of complementary mold halves adapted to be opened and closed and defining a mold cavity having a longitudinal axis and adapted to receive an elongated tubular length of softened plastic material, means on said mold halves adjacent one end of the mold cavity for collapsing and sealing the tubular plastic material when the mold is closed, a cutting blade on said mold adjacent the opposite end of the mold cavity for severing the tubular plastic material upon closure of the mold, and retractable fluid injection means operably arranged at the opposite end of the mold cavity in coaxial alignment with said longitudinal axis for introducing an expanding fluid axially into the severed open end of the tubular plastic material when the mold is closed.

13. In an apparatus for making hollow plastic articles, a sectional mold comprising a pair of complementary mold halves adapted to be opened and closed and defining a mold cavity having a longitudinal axis and adapted to receive an elongated tubular length of softened plastic material, means on said mold halves adjacent one end of the mold cavity for collapsing and sealing the tubular plastic material when the mold is closed, a cutting blade on said mold adjacent the opposite end of the mold cavity for severing the tubular plastic material upon closure of the mold, said blade having an aperture therethrough adapted to be positioned coaxially with the longitudinal axes of the mold cavity and the tubular plastic material contained therein when the mold is closed, and a retractable fluid injection needle mounted adjacent said opposite end of the mold cavity and adapted to extend through said aperture for introducing an expanding fluid axially into the severed open end of the tubular plastic material when the mold is closed.

14. In an apparatus for making hollow plastic articles, a sectional mold comprising a pair of complementary mold halves adapted to be opened and closed and defining a mold cavity having a longitudinal axis and adapted to receive an elongated tubular length of softened plastic material, means on said mold halves adjacent one end of the mold cavity for collapsing and sealing the tubular plastic material when the mold is closed, a cutting blade on said mold adjacent the opposite end of the mold cavity for severing the tubular plastic material upon closure of the mold, said blade having an aperture therethrough adapted to be positioned coaxially with the longitudinal axes of the mold cavity and the tubular plastic material contained therein when the mold is closed, a retractable fluid injection needle mounted adjacent said opposite end of the mold cavity and shiftable axially for extension through the aperture of the cutting blade into the severed open end of the tubular plastic material when the mold is closed, and sealing means carried by said needle and adapted to extend into said aperture into sealing relation with the adjacent end of the mold and the severed open end of the tubular plastic material whereby to permit introduction of an expanding fluid into said severed open end and consequent expansion of the plastic material into contact with the walls of the mold cavity.

15. In an apparatus for making hollow plastic articles, a sectional mold comprising a pair of complementary mold halves defining a mold cavity having a longitudinal axis and adapted to receive an elongated tubular length of softened plastic material, said mold halves being hinged together for opening and closing of the mold, a pair of coacting jaws on said mold halves adjacent one end of the mold cavity for collapsing and sealing the tubular plastic material when the mold is closed, a cutting blade mounted on one of said mold halves adjacent the opposite end of the mold cavity for severing the tubular plastic material transversely upon closure of the mold, said blade having an aperture therethrough adapted to be positioned substantially coaxially with the longitudinal axes of the mold cavity and the tubular plastic material contained therein when the mold is closed, a retractable fluid injection needle shiftably mounted adjacent said one mold half and adjacent said opposite end of the mold cavity, said needle being axially extensible for protrusion through the aperture of the cutting blade into the severed open end of the tubular plastic material when the mold is closed, and annular sealing means carried by said needle and movable therewith, said sealing means being adapted to extend into said aperture into sealing relation with the adjacent end of the mold surrounding the severed open end of the tubular plastic material whereby to permit introduction of an expanding fluid axially into said severed open end and consequent expansion of the plastic material into contact with the walls of the mold cavity.

16. An apparatus for making hollow plastic articles from a continuous length of softened tubular plastic material comprising in combination an upright rotatable disk mounted for rotation on a horizontal axis, a plurality of mold supports extending outwardly in a horizontal direction at one side of said disk in circumferentially spaced arrangement, adjustable means cooperating with said supports and with said disk for securing the supports in desired adjusted position radially of said disk, a plurality of sectional molds each mounted adjacent the outer end of one of said mold supports whereby said molds traverse a continuous path in a vertical plane upon rotation of said disk, said molds each comprising an inner mold half rigidly secured to the corresponding mold support and an outer mold half hingedly affixed to the inner mold half for pivotal movement toward and away from said disk, actuating means for opening and closing the outer half of each of said molds in predetermined sequence, said molds being adapted to receive the tubular plastic material when the molds are open, and fluid injection means operably associated with each of said molds for injecting an expanding fluid into said molds for expanding the tubular material contained therein.

17. The apparatus of claim 2 further characterized in that said rotatable disk is provided with variable speed drive means for effecting rotation of said disk at a predetermined speed in excess of the supply rate of said tubular plastic material whereby to effect controlled elongation and consequent diminution of the wall thickness of the tubular plastic material.

18. An apparatus for making hollow plastic articles from a softened tubular plastic material comprising in combination a plurality of sectional molds each comprising a pair of mold halves defining a mold cavity having a longitudinal axis and adapted to receive the tubular plastic material when the mold is open, a rotatable support carrying said molds for successive alignment thereof with the tubular plastic material, means carried by said support for opening and closing said mold halves in predetermined sequence, means on each of said molds adjacent one end of the mold cavity for collapsing and sealing the tubular plastic material when the mold is in closed position, and retractable means operably associated with each of said molds adjacent the opposite end of the mold cavity for introducing an expanding fluid axially into the tubular plastic material when the mold is closed.

19. The apparatus of claim 18 further characterized in that each of said sectional molds comprises a pair of hinged mold halves.

20. In an apparatus for making hollow plastic articles, a sectional mold comprising a pair of complementary mold halves adapted to be opened and closed and defining a mold cavity having a longitudinal axis adapted to receive an elongated tubular length of softened plastic material, means on said mold halves adjacent one end of the mold cavity for collapsing and sealing the tubular plastic material when the mold is closed, a movable fluid injector operably associated with said mold adjacent the opposite end of the mold cavity for introducing an expanding fluid axially into the opposite end of the length of tubular plastic material contained in the mold when the latter is closed, actuating means for effecting back and forth axial shifting movement of said fluid injector, said injector being shiftable in one direction of movement thereof into extended position for introducing expanding fluid axially into the tubular plastic material and being shiftable in the opposite direction of movement thereof into retracted position in spaced relation from said opposite end of the length of tubular plastic material, and means for supplying expanding fluid to said injector when the latter is in extended position and for interrupting the supply of expanding fluid when the injector is in said retracted position.

21. The apparatus of claim 2 further characterized in that the inner half of each of said molds has at one end thereof guide means cooperable with the tubular plastic material during rotation of the disk for aligning said material in the mold.

22. The apparatus of claim 18 further characterized in that each of said molds is provided at said one end of the mold cavity with guide means engageable with the tubular plastic material during rotation of said support for accurately registering said material in the mold cavity.

23. The apparatus of claim 20 further characterized in that at least one of said mold halves is provided at said one end of the mold cavity with guide means adapted to engage the tubular plastic material for guiding and registering the latter along the longitudinal axis of the mold cavity.

24. The apparatus of claim 2 further characterized in that the mold halves of each of said molds are provided with coacting pinching jaws adjacent one end of the mold for collapsing and sealing the tubular plastic material when the mold is closed, and said fluid injection means is disposed at the opposite end of the mold for introducing the expanding fluid axially into the tubular plastic material.

25. The apparatus of claim 18 further characterized in that said retractable means comprises an elongated hollow needle having means for supplying expanding fluid thereto, piston and cylinder means operably associated with the needle for actuating the same, spring means for moving the piston in one direction, and means for supplying actuating fluid to the cylinder for moving the piston in the other direction.

26. The apparatus of claim 20 further characterized in that said actuating means comprises a cylinder, a piston slidably mounted in the cylinder and connected to the fluid injector, spring means for moving the piston and fluid injector into said retracted position, and means for supplying fluid to the cylinder for moving the piston and fluid injector into said extended position.

27. An apparatus for making hollow plastic articles from softened tubular plastic material comprising in combination a plurality of sectional molds each comprising a pair of mold halves defining a mold cavity having a longitudinal axis and adapted to receive the tubular plastic material when the mold is opened, a rotatable support carrying said molds for successive alignment thereof with the tubular plastic material, means carried by said support for opening and closing said mold halves in predetermined sequence, means on each of said molds adjacent one end of the mold cavity for collapsing and sealing the tubular plastic material when the mold is in closed position, displacing means on each of said molds at the opposite end of the mold cavity radially engageable with the tubular plastic material upon closure of the mold for axially disconnecting the portion of the tubular plastic material extending beyond said opposite end of the mold cavity with respect to the axis of the portion of the tubular material within the mold cavity, and retractable fluid injection means associated with each of said molds adjacent said opposite end of the mold cavity in coaxial alignment with said longitudinal axis for introducing an expanding fluid axially into the end of the portion of tubular plastic material contained within the mold when the mold is closed.

28. An apparatus for making hollow plastic articles from softened tubular plastic material comprising in combination a plurality of sectional molds each comprising a pair of mold halves defining a mold cavity having a longitudinal axis and adapted to receive the tubular plastic material when the mold is open, a rotatable support carrying said molds for successive alignment thereof with the tubular plastic material, means carried by said support for opening and closing said mold halves in predetermined sequence, means on each of said molds adjacent one end of the mold cavity for collapsing and sealing the tubular plastic material when the mold is in closed position, a displacing element mounted on one half of each of said molds adjacent the opposite end of the mold cavity and radially engageable with the tubular plastic material upon closure of the mold for axially disconnecting the portion of the tubular material extending beyond said opposite end of the mold cavity with respect to the axis of the portion of tubular material within the mold cavity, said element having an aperture therethrough adapted to be positioned coaxially with the longitudinal axes of the mold cavity and the tubular plastic material contained therein when the mold is closed, and a retractable fluid injection needle at said opposite end of each of said molds and adapted to extend through said aperture for introducing an expanding fluid axially into the end of the tubular plastic material within the mold cavity when the mold is closed.

29. In an apparatus for making hollow plastic articles, a sectional mold comprising a pair of complementary mold halves adapted to be opened and closed and defining a mold cavity having a longitudinal axis and adapted to receive an elongated segment of softened tubular plastic material, means on said mold halves adjacent one end of the mold cavity for collapsing and sealing the tubular plastic material when the mold is closed, a displacing element mounted on said mold adjacent the opposite end of the mold cavity radially engageable with the tubular plastic material upon closure of the mold for axially disconnecting the portion of the tubular material extending beyond said opposite end of the mold cavity with respect to the axis of the portion of tubular material within the mold cavity, and retractable fluid injection means operably arranged at said opposite end of the mold cavity in coaxial alignment with said longitudinal axis for introducing an expanding fluid axially into the end of the tubular material within the mold cavity when the mold is closed.

30. The apparatus of claim 29 further characterized in that said element has an aperture therethrough adapted to be positioned coaxially with the longitudinal axes of the mold cavity and the tubular plastic material contained therein when the mold is closed, and said fluid injection means comprises a needle adapted to extend through said aperture.

31. The apparatus of claim 6 further characterized in that the mold halves of each of said molds are formed to provide when the mold is closed and end opening in the mold at said opposite end of the mold cavity, said end opening being closable by the sealing means when the fluid injector is in said extended position within the mold.

32. The apparatus of claim 11 further characterized in that the mold halves of each of said molds are formed to provide when the mold is closed an end opening in the mold at said opposite end of the mold cavity, said end opening being closable by the sealing means when the fluid injector is in said extended position within the mold.

33. In the method of making hollow plastic articles from softened tubular plastic material by supplying a continuous length of softened tubular plastic material in a downward and generally vertical direction, sealing a segment of said tubular material at the opposite ends thereof, and expanding said segment while moving the same in a curved path whereby to change the angular position of the longitudinal axis of the segment between vertical and horizontal positions, the improvement which comprises introducing an expanding fluid into the sealed segment while the latter is still in substantially vertical position whereby expansion of said tubular plastic material is initiated before the segment reaches horizontal position thereby avoiding transverse sagging and distortion of the segment.

34. A method of making hollow plastic articles from softened tubular plastic material which comprises continuously supplying a moving length of softened tubular plastic material, collapsing and sealing a segment of said tubular material at one end thereof, severing the tubular material at the opposite end of said segment and leaving said opposite end substantially open, thereafter introducing an expanding fluid through the substantially open severed end of said segment in a path substantially coincident with the longitudinal axis of said segment, and expanding the segment of tubular material while confining the same to obtain a hollow article of predetermined shape.

35. A method of making hollow plastic articles from softened tubular plastic material, which comprises continuously supplying a moving length of softened tubular plastic material, collapsing and sealing a segment of said tubular material at the trailing end thereof with respect to the direction of movement of said tubular material, severing the tubular material at the leading end of said segment and leaving said leading end substantially open, thereafter introducing an expanding fluid through the substantially open severed leading end of said segment in a path substantially coincident with the longitudinal axis of said segment, and expanding the segment of tubular material while confining the same to obtain a hollow article of predetermined shape.

References Cited in the file of this patent
UNITED STATES PATENTS

| | | |
|---|---|---|
| 1,052,081 | Miltner | Feb. 4, 1913 |
| 1,592,536 | O'Neill | July 13, 1926 |
| 1,685,523 | Hurlburt | Sept. 25, 1928 |
| 1,750,972 | Soubier | Mar. 18, 1930 |
| 1,942,993 | Aultman et al. | Jan. 9, 1934 |
| 1,981,636 | Soubier | Nov. 20, 1934 |
| 1,984,697 | Person | Dec. 18, 1934 |
| 2,172,546 | Riel | Sept. 12, 1939 |
| 2,288,454 | Hobson | June 30, 1942 |
| 2,317,763 | Hall | Apr. 27, 1943 |
| 2,515,093 | Mills | July 11, 1950 |
| 2,579,390 | Mills | Dec. 18, 1951 |
| 2,579,399 | Ruekberg | Dec. 18, 1951 |
| 2,597,558 | Bailey | May 20, 1952 |